United States Patent
Hlatky, Jr. et al.

(10) Patent No.: US 9,454,918 B1
(45) Date of Patent: Sep. 27, 2016

(54) MATCHING REFERENCE CALL PARAMETERS FOR ANIMAL CALL LOGGING AND FOR TRAINING A USER TO USE AN ANIMAL CALLING DEVICE

(71) Applicants: Joseph F Hlatky, Jr., Ellicott City, MD (US); Steven Dwight Thomas, Jr., Spokane, WA (US)

(72) Inventors: Joseph F Hlatky, Jr., Ellicott City, MD (US); Steven Dwight Thomas, Jr., Spokane, WA (US)

( * ) Notice: Subject to any disclaimer, the term of this patent is extended or adjusted under 35 U.S.C. 154(b) by 570 days.

(21) Appl. No.: 13/691,832

(22) Filed: Dec. 2, 2012

Related U.S. Application Data (60) Provisional application No. 61/592,595, filed on Jan. 31, 2012.

(51) Int. Cl.
  *G09B 25/00* (2006.01)
(52) U.S. Cl.
  CPC ................ *G09B 25/00* (2013.01)
(58) Field of Classification Search
  CPC ........ G09B 19/00; G09B 19/02; G09B 1/00; G09B 1/01; G09B 25/00
  See application file for complete search history.

(56) References Cited

U.S. PATENT DOCUMENTS

| | | | |
|---|---|---|---|
| 2003/0120367 A1* | 6/2003 | Chang et al. | 700/94 |
| 2005/0062588 A1* | 3/2005 | Spector | 340/3.1 |
| 2005/0191603 A1* | 9/2005 | Budra et al. | 434/178 |
| 2010/0279752 A1* | 11/2010 | Kim | 463/1 |

OTHER PUBLICATIONS

Wikipedia, Big Buck Hunter, Wayback Machine capture dated Aug. 7, 2010, obtained at http://web.archive.org/web/20100807235452/http://en.wikipedia.org/wiki/Big_Buck_Hunter.

Cass Creek Game Call Sampler ITunes Preview, dated Jun. 7, 2011, obtained at https://itunes.apple.com/tw/app/id438868350.

* cited by examiner

*Primary Examiner* — Timothy A Musselman (57) ABSTRACT

Example techniques are disclosed for processing of animal calls. For example, sound can be matched to one or more reference calls to identify whether the sound matches the reference calls. In one example, a user operates an animal calling device and is provided with feedback on whether they have correctly operated the calling device, e.g., whether they sound like the animal they are trying to emulate. In another example, a trail camera is provided that generates a log of animal calling activity while taking pictures of animals moving through a given area.

20 Claims, 6 Drawing Sheets

MATCHING REFERENCE CALL PARAMETERS FOR ANIMAL CALL LOGGING AND FOR TRAINING A USER TO USE AN ANIMAL CALLING DEVICE

I. PRIORITY

This application claims priority to U.S. Provisional Application No. 61/592,595, filed Jan. 31, 2012, which is incorporated herein by reference in its entirety.

II. BACKGROUND

Hunters and other nature enthusiasts may use various calling devices to simulate the sounds made by animals in the wild, e.g., to locate particular animals or even to lure them closer. Animal calling devices can include easy-to-use electronic devices that reproduce particular sounds with essentially perfect accuracy. However, in many jurisdictions, using electronic game calling devices of this type is illegal for certain activities, e.g., particularly hunting animal such as big game.

Animal calling devices can also be embodied as mechanical devices incorporating diaphragms, reeds, boxes, etc. In the case of mechanical animal calling devices, it is often difficult for a user to develop any confidence in their ability to accurately replicate animal sounds without actually going out into nature and interacting with real animals. For example, a user of a diaphragm-style elk calling device may start out making a rather startling variety of noises in an effort to replicate the sound of a real elk. Usually, it takes quite a bit of practice before the user is satisfied that they are making a sound that is reasonably close to that of a real elk. Even then, the user doesn't really know for sure how an elk in the wild will react when the user operates the calling device in the wild. For users who spend a great deal of time in the outdoors calling a particular species of animal, they may have time to develop their calling ability to the point where they are successful at locating or luring that particular species. However, users who infrequently get outdoors or do not live near areas where certain species of animals inhabit may find the learning curve for calling that species relatively difficult. This problem is particularly acute when the user needs to learn how to call a particular animal within a relatively short period of time, e.g., a two-week long hunting season in a location that is far away from their home.

III. SUMMARY

Consistent with the invention, there is provided a technique that can include storing one or more reference call parameters for a reference call. The reference call can be a recording of an animal sound. The technique can also include receiving a user call. The user call can be a live sound made by a user operating a mechanical animal calling device. The technique can also include extracting one or more user call parameters from the user call, comparing the one or more user call parameters to the one or more reference call parameters, and providing an indication of whether the user call matches the reference call based on the comparing. At least the comparing can be performed by a computing device.

Consistent with the invention, there is provided a system that can include a processor and a video game configured to execute on the processor. The video game can include logic configured to receive one or more user call parameters corresponding to a user call. The user call can be made by a user operating a mechanical animal calling device. The logic can also be configured to compare the one or more user call parameters to one or more reference call parameters of a reference call to determine whether the one or more user call parameters match the one or more reference call parameters. The logic can also be configured to, responsive to the one or more user call parameters matching the one or more reference call parameters, cause an animal to appear on a screen, appear to move closer to the user, or to respond to the user call. The logic can also be configured to, responsive to the one or more user call parameters not matching the one or more reference call parameters, cause the animal not to appear on the screen, to appear to move further away from the user, or to not respond to the user call.

Consistent with the invention, there is provided a device that includes a processor and logic configured to operate on the processor. The logic can detect movement of animals in a vicinity of the trail camera, capture and store pictures of detected animals with associated dates and times when the pictures of the detected animals were captured, and monitor ambient sound received at the trail camera. The logic can also determine whether the ambient sound matches reference call parameters corresponding to a type of animal call, and log instances when the ambient sound matches the reference call parameters.

IV. BRIEF DESCRIPTION OF THE DRAWINGS

The accompanying drawings show certain aspects of the present inventive concepts.

V. DETAILED DESCRIPTION

Generally speaking, the embodiments disclosed herein can match candidate sounds to determine whether they match reference sounds, where the reference sounds are animal calls of some type. For example, some implementations can train a user to use an animal calling device by analyzing sounds made by the user and providing the user with an indication of whether the sounds are appropriate, e.g., whether the user sounds like the particular animal they are trying to emulate. Further examples may perform logging of animal sounds by an electronic device, e.g., an electronic device such as a trail camera left in a natural environment.

In a first example used to illustrate certain inventive concepts disclosed herein, the user may operate a mechanical animal calling device using, e.g., their mouth to produce a sound, and a processing device can analyze the sound made by the user. The processing device can analyze the sound, for example, by comparing the sound to a prerecorded sound made by an actual animal, such as an elk, or multiple prerecorded sounds made by one or more such animals. If the sound made by the user is sufficiently similar to the prerecorded sound or sounds, the processing device can provide an indication to the user that they have correctly operated the calling device. Otherwise, the processing device can provide an indication to the user that the sound was incorrect, and, in some implementations, can provide suggestions to the user for how to operate the calling device to sound more like the animal they are trying to emulate.

System Example

Figure 1:
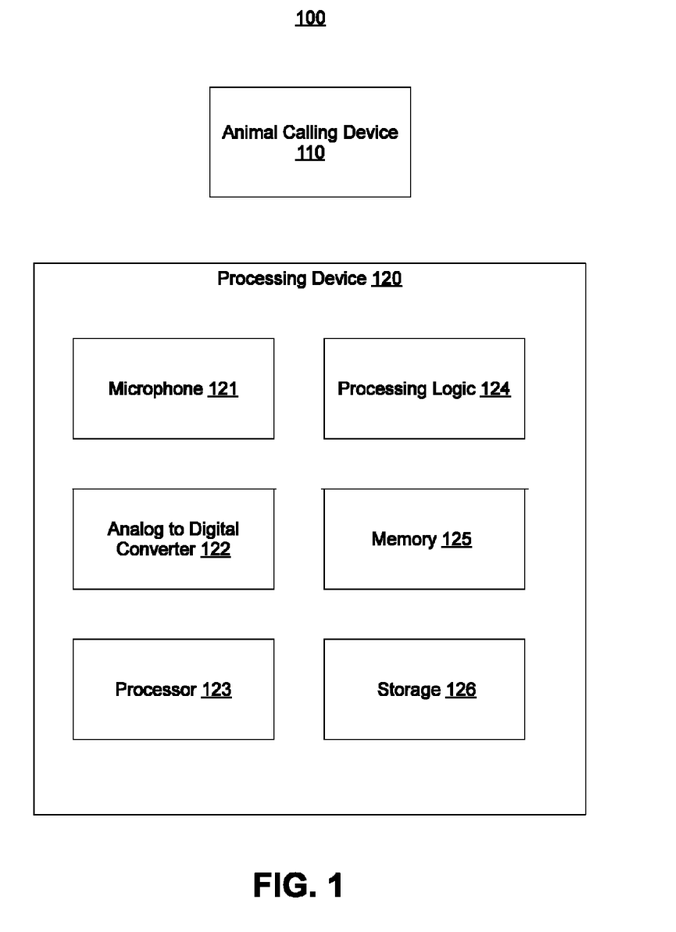
FIG. 1 is a block diagram of a system consistent with certain embodiments of the invention.

FIG. 1 is an example of a system 100 that can be used in some implementations. System 100 can include an animal calling device 110. Generally speaking, animal calling device 100 can be a mechanical device for calling animals such as elk, deer, turkeys, geese, ducks, predators, etc. Specific types of calling devices include diaphragm//reed type calling devices (e.g. Primos® Mini Sonic Dome, perhaps with a grunt tube, Primos® Terminator reed/grunt tube combo), box calling devices (e.g., Primos® Chick Magnet Box Turkey Call), rattling horns/antlers (real or synthetic, also rattling bags), slate calling devices (e.g., M.A.D. Cherry Bomb Slate Turkey Call®), bellows calling devices (e.g., Primos® Hoochie Mama™), bite-and-blow whistle-style calling devices (e.g., Primos® Cow Girl™), etc.

Figure 2A:
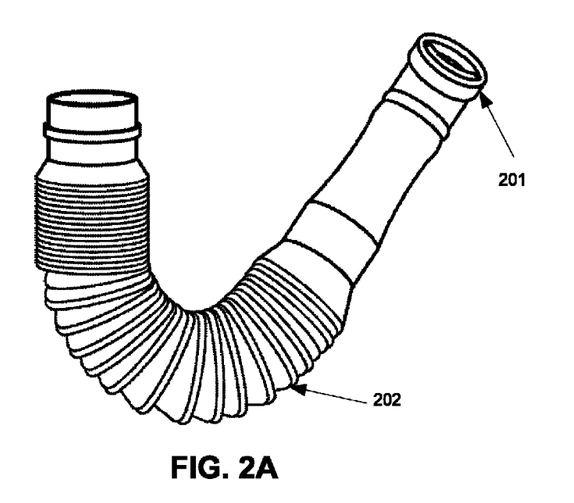
FIGS. 2A, 2B, and 2C illustrate exemplary calling devices consistent with certain embodiments of the invention.
Figure 2B:
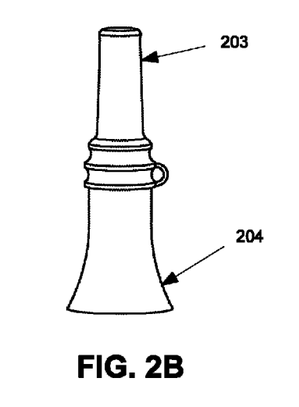
Figure 2C:
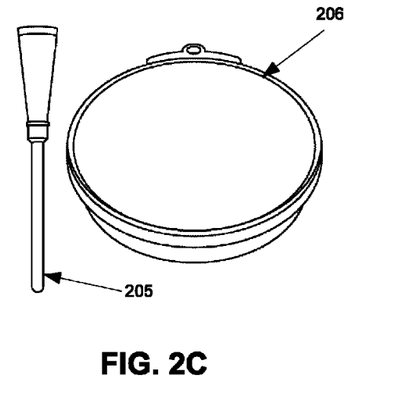

FIGS. 2A-2C illustrate some of the various types of calling devices mentioned above. FIG. 2A illustrates a reed and grunt tube combination with a reed portion 201 that can snap onto a grunt tube portion 202. Generally, reed portion 201 can include a flexible membrane that a user blows against while adjusting pressure with their mouth. Depending on how hard the user blows and how much pressure they apply, the user can adjust the volume and frequency of the call, respectively. FIG. 2B illustrates a bite-and-blow whistle style call with a mouth portion 203 and a cone portion 204. Generally, whistle style calls use a similar principle of operation where users adjust pressure on the mouth portion to control frequency and can blow harder/softer to control volume. Both the reed portion 201 and mouth portion 203 can provide some resistance to the pressure applied by the user, which can help the user control the sounds they produce. FIG. 2C shows a slate call with a striker portion 205 and a slate portion 206. Slate calls use a different principle of operation where the user drags striker portion 205 over slate portion 206 (e.g., circular, oval, back and forth motions, etc.) to create sounds.

Referring back to FIG. 1, system 100 can also include a processing device 120. Processing device 120 can include a microphone 121, an analog-to-digital converter (A2D) 122, a processor 123 (e.g., single or multicore microprocessor(s), CPU, etc.), processing logic 124 (e.g., computer-readable instructions), memory 125, and storage 126. Generally speaking, microphone 121 can be configured to receive sound waves, including from animal calling device 110, A2D converter 122 can be configured to convert the sounds received by the microphone to a digital representation, and processor 123 can be configured to execute processing logic 124. Processing logic 124 can be read into memory 125 from storage 126 for execution. Memory 125 can include one or more memory devices such as various forms of RAM. Storage 126 can include optical storage devices, hard drive, flash drives, etc. Although not shown in FIG. 1, processing device 120 can also include or be configured to control one or more displays, e.g., computer monitors, televisions, etc. to provide various user interfaces discussed herein.

Note that processing device 120 can be embodied as a computing device with a general-purpose computing architecture, e.g., processing device 120 can be a computer, such as a laptop, desktop, etc., or a mobile device such as a PDA or cellular phone. In other implementations, processing device 120 can be a server computer communicating with another computer over a network. In further implementations, processing device 120 is embodied as game console or stand-alone video arcade game with which a user can interact while playing a hunting-style video game. In other implementations, processing device 120 can also be a special-purpose device without the general-purpose architecture shown in FIG. 1. For example, processing device 120 can be a relatively simple handheld processing device with processing logic 124 embodied as one or more circuits such as field-programmable gate arrays (FPGAs) or application-specific integrated circuits (ASICs). In such embodiments, internal circuitry of processing device 120 can provide indications to a user of animal calling device 110 via a small display screen, audio feedback, one or more light-emitting diodes (LEDs), etc. In some embodiments, processing device 120 is embodied as a relatively small device that can be carried in a user's pocket or worn around the neck with a lanyard while hunting. As also discussed more below, processing device 120 can be embodied as a trail camera.

Method Example

Figure 3:
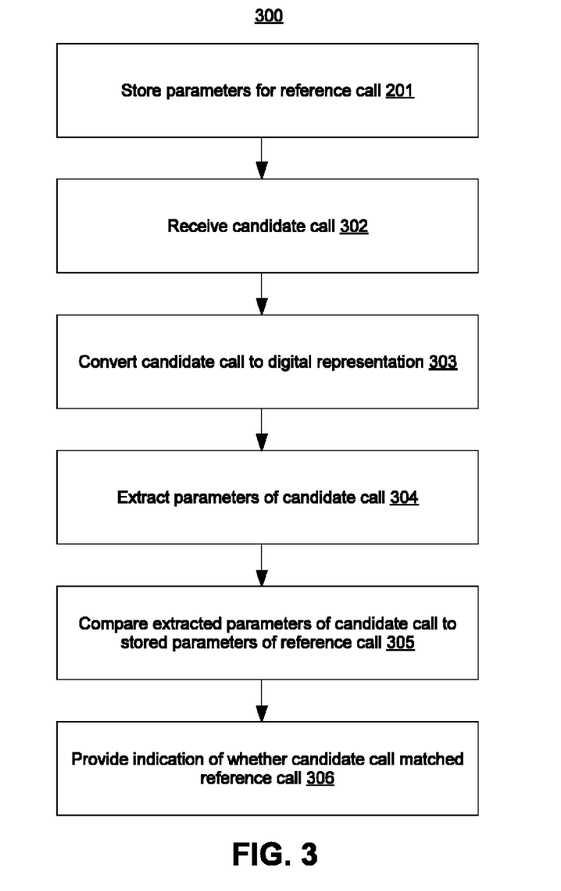
FIG. 3 is a flow chart of an exemplary method consistent with certain embodiments of the invention.

FIG. 3 illustrates an exemplary method 300 consistent with certain embodiments. Generally speaking, method 300 can be used for providing a user with an indication of whether they have correctly operated an animal calling device. As also discussed more below, method 300 can be used to generate a log of animal calling activity, such as on a trail camera. Method 300 can be performed using processing logic 124 executing on processor 123.

Method 300 begins at block 301, where parameters are stored for a reference call. For example, the reference call can be an actual recording of a live animal making a particular sound, of an individual correctly using an animal calling device (e.g, an expert user), etc. For the purposes of a simple numerical example, assume the reference call is at a constant frequency of 1000 Hz, lasts exactly one second, and has a constant volume of 100 dB. In this case, the parameters can be 1 second duration, 1000 Hz, and 100 dB. In some implementations, reference call parameters can be represented as a range of volume, frequency, and/or duration as well. Furthermore, in some implementations, feature vectors such as those used in speech processing can also be used as parameters. Note also that, in some implementations, block 301 can also include extracting the parameters from the reference call, e.g., determining volume, frequency, etc., at predetermined time intervals of the reference call. For example, the predetermined time intervals can correspond to a sampling interval.

Next, at block 302, a candidate call is received. For example, a user can operate the animal calling device to produce a sound, and the user call can be treated as a candidate call. As another example, sounds in nature can be received and treated as candidate calls. The sound can be received by the microphone and transduced into a voltage signal that is provided to the A2D converter 122.

Next, at block 303, the voltage signal can be converted into a digital representation of the candidate call. For example, A2D converter 122 can convert the received sound into the digital representation of the candidate call. The digital representation can include digital samples of the sound at a given sampling rate.

Next, at block 304, parameters of the candidate call can be extracted. For example, the processing logic can process the digital representation of the candidate call to identify the frequency, duration, and volume of the candidate call for a plurality of individual samples. In other implementations, feature vectors of the candidate call can be extracted, e.g., using speech processing techniques. In other implementations, audio fingerprinting techniques are used to determine the parameters.

Next, at block 305, the extracted parameters of the candidate call can be compared to the stored parameters of the reference call. For example, acceptable variances for frequency, duration, and volume can be established, e.g., as a simple example, plus or minus 0.5 KHz, 0.1 second, and 3 dB. The processing logic can determine whether each of the three parameters of the user call is within the corresponding variance, e.g., for each sample. In embodiments where feature vectors are used, the feature vectors can be used to determine a distance metric that reflects a relative distance between the feature vector for the user call and the feature vector for the reference call. Such implementations can determine whether the distance between the feature vectors is within a given threshold.

Next, at block 306, the processing device can provide an indication of whether the candidate call matches the reference call. If the extracted parameters of the candidate call are within the corresponding variances (or the distance between the feature vectors is within the threshold), an indication can be provided (e.g., displayed, logged, etc.) indicating the match. For example, when the candidate call is made by a user operating an animal call, an interface can be shown to the user indicating that matched the reference call, e.g., they operated the call correctly. Otherwise, an indication can be provided to the user indicating that they did not operate the call correctly.

When the candidate call is obtained from ambient sounds in nature, the indication can be provided by logging calling activity in storage. For example, processing device 120 can be left overnight in a natural environment and continually perform blocks 302-306 method 300 to identify instances when particular types of calls occurred, e.g., a log of elk bugling activity overnight indicating times when bugles occurred. Note that a predetermined volume threshold can be applied to the ambient sound before performing method 300, e.g., sounds that do not exceed a predetermined volume are not treated as candidate calls.

Some logging implementations can also record the bugling activity itself while discarding other sounds, e.g., a processing time window (perhaps 1 minute) can be maintained in storage and processed to identify calling activity. When calling activity is detected in the processing window, the detected call (e.g., matching ambient sound) can be kept in storage. Additional sound from the processing window can be retained with the matching sound, e.g., a recording time window of 5 seconds before and after each call can be retained from the processing window in storage and the remainder of the processing window can be deleted. Users can thus retrieve the processing device, review the log of animal calling activity, and listen to the recorded calling activity with 5 seconds of preceding sound and 5 seconds of sound after each matching call, which can provide some context for the user. Some implementations may provide adjustable recording time windows so that users can provide inputs to adjust the duration of time that is recorded before and after each matched call. Thus, the user can adjust the recording window to hear more or less activity before and after the window that may not match the reference call, e.g., the user may hear the animal moving around, making other noises, etc. If the user opts for a longer recording window that is longer than the processing window, the processing window can be correspondingly adjusted to be longer than the recording window so that the preceding recording window of sounds are still in storage if a call is matched at block 305.

Sound Parameters

As mentioned above with respect to block 305, various parameters can be used to compare sounds. In many cases, a user operating a particular calling device may find it easiest to control the frequency (e.g., the fundamental) and duration of the call. The calling device themselves may tend to produce specific timbres, e.g., vibrato (frequency modulation), tremolo (amplitude modulation), harmonics, etc., and thus, in some implementations, these parameters are not considered. However, in other implementations, vibrato, tremolo, and harmonic parameters can also be measured and used to compare the reference call and the user call.

As another example of how method 300 can be applied, consider an exemplary animal call, e.g., an elk bugle. An elk bugle can be viewed as a three-phase vocalization. As a simple numerical example, an elk bugle be represented as a first phase of generally increasing frequency from approximately 0.5 Khz to 2 Khz, a whistle-like second phase with a relatively constant frequency of approximately 2 Khz, and a third phase of generally decreasing frequency from approximately 2 Khz back to 0.5 Khz. The rate that the frequency increases in the first phase can generally be somewhat slower than the rate that the frequency decreases in the third phase, and accordingly the third phase can be somewhat shorter in duration than the first phase. For example, the duration of the three phases of an individual elk bugle could be roughly 1 second, 1.2 seconds, and 0.3 seconds, respectively, for a totally duration of 2.5 seconds. Note that these specific durations are chosen for the sake of providing a relatively simple numerical example and variation in actual animal calls is to be expected.

In some implementations, the fundamental frequency of both the reference call (the individual elk bugle example above) and the candidate call can be measured every 0.1 seconds, e.g., 25 samples for the individual elk bugle reference call. The candidate call can be compared to the reference call at each of these 25 intervals to see if the frequency of the user call falls within some acceptable variance, e.g., 0.05 Khz. If so, the candidate call can be considered a match, and an indication can be provided that the candidate call matched the reference call. For user-training implementations, an indication that the user call did not match the reference call. For logging implementations, it is generally implied that no match was made for time intervals when no log entry is made. Generally speaking, the term "indication" as used herein can refer to any way of communicating to a user that a candidate call matched or did not match a reference call, e.g., displaying a message on a GUI, lighting an LED on a device, color-coding schemes (e.g., red for no match, green for match), logging messages, rating a candidate call (or phase of a candidate call) on a scale from 1-10, controlling behavior of an animal in a video game responsive to a candidate call, etc.

Note that, in some implementations, the candidate call can be considered to match the reference call when less than a certain number of samples are outside the acceptable variance. For example, at least five samples could need to be outside the acceptable variance before the candidate call is considered not a match. In still further implementations, the differences between each sample of the candidate call from the reference call can be added together and compared to an aggregate threshold. If the sum of these differences is within the aggregate threshold, the candidate call can be considered to match the reference call, and otherwise not a match. Other implementations may define candidate call as not matching when any single sample of sufficient volume (e.g., above a threshold) is substantially "wrong" (e.g., not within a natural range of frequencies made by the animal species being called, etc.). This can help identify instances when the user simply misuses the call and does not make a sound that is anything like what an animal would actually make.

In some implementations, time-alignment techniques can be used to align the samples of the reference call and the candidate call in order to ensure the appropriate samples are compared. In other implementations, techniques such as audio fingerprinting can be used and metrics associated with such techniques can be used to characterize the differences between the candidate call and the reference call. In still further implementations, speech processing techniques can be used. For example, a speech translation system could be trained using a number of reference calls. The candidate call can be classified by such a speech translation system and the classification can be used to determine whether the candidate call matches the reference call. To some extent, the particular techniques used to compare reference calls and candidate calls can depend on the type of call being used. For example, a whistle-type elk cow call generally allows the user to control volume, frequency, and duration, but does not lend itself to complex vocalizations. Thus, these parameters may be sufficient for determining whether a user is correctly operating a whistle-type cow call. Mouth-style diaphragm calls may permit more complex phrasing by the user, and, depending upon how much precision is desired, speech processing techniques may be suitable for classifying sounds made by such calls. However, in many cases, just getting a user to learn how to operate a call at approximately the correct frequency and duration can improve the user's calling ability substantially.

User Feedback

The following discussion pertains to implementations where the candidate call is produced by a user operating a calling device, e.g., to learn how to operate the device, in the context of a video game, etc. As mentioned above, the user can be provided with an indication of whether their call matched a particular reference call or calls. For calls with multiple phases, e.g., elk bugles, the user can also receive an indication of which phase(s) of their user call did not match, as well as instructions on how to operate the call more effectively. For example, if the user call is generally of the correct duration but the third phase does not descend in frequency quickly enough, the user can be instructed via a graphical interface, e.g., with a message (text, audio, etc.) to release pressure with their tongue more quickly during the third phase when using, e.g., a diaphragm call. Similarly, if the user reaches the second phase too quickly, the user can be instructed to slow the rate at which they apply pressure to the diaphragm call in the first phase of the call. If the second phase is too low of a frequency, the user can be instructed to maintain more pressure during this phase of the call, and so on. Generally, this can be performed by comparing parameters of the reference call to parameters of the user call for a given phase of the call.

As another example of how the user can be provided with instructions on how to operate the call, consider a slate call for calling turkeys. Depending on the sounds made by the user, the user can be instructed how to operate the call to cure whatever deficiencies exist in their user call. For example, a user trying to make a cluck may make a sound that is too long in duration. Such a user can be instructed to shorten the stroke of their cluck if the frequency is relatively correct. Conversely, the user can be instructed to move the striker more quickly if the frequency is too low, move the striker more slowly if the frequency is too high, etc.

The particular interface used to instruct a user can vary depending on the capabilities of the processing device. On a portable device with just LED's as an interface, a simple green/red LED for pass/fail can be used to let the user know whether they correctly made a particular type of call. In further implementations, different LED's can be used to signal which individual phases of the call are correct or incorrect, as well as whether these phases (or the call as a whole) are too high/low in frequency, too long/short, too loud/quiet, etc. One example implementation for a bugle may include a total of 9 LED's in groups of 3, 1 group per phase. Each group may include a first LED indicating the frequency (or slope) is too low, a second LED indicating the frequency is correct, and a third LED indicating the frequency is too high. A fourth set of LED's may include a first LED that triggers for the duration of the first phase, a second LED that triggers for the duration of the second phase, and a third LED that triggers for the duration of the third phase. Users operating the call can start the call when the first LED lights, begin the second phase when the second LED lights, and begin the third phase when the third LED lights. Other implementations may provide phase-specific indicators of when to start particular phases of a call and whether the individual phases are too high, too low, or correct frequency.

Figure 4:
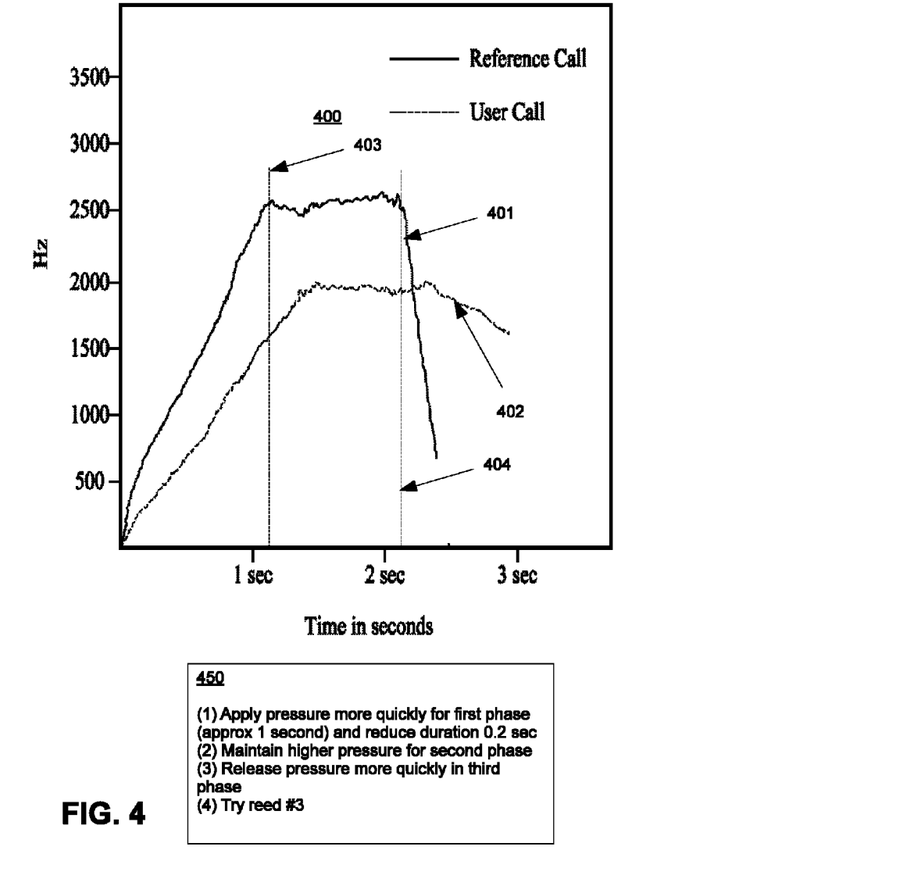
FIG. 4 shows graphical user interfaces for training a user consistent with certain embodiments of the invention.

FIG. 4 illustrates exemplary graphical user interfaces 400 and 450 that can be provided to a user (together or separately) as feedback as they operate an animal call. Interface 400 is shown in a configuration where the user is trying to emulate an elk bugle. Solid line 401 represents frequency (y axis) of a reference call over time (x axis), and dashed line 402 represents the frequency made by the user operating a calling device (e.g., a reed/grunt tube combo). Here, the user call generally matches the three-phase shape of the reference call, but does not increase sufficiently in the first phase, plateaus too low at the second phase, and does not drop in frequency at a fast enough rate. Thus, the user can adjust their calling style to more closely match the reference call by practicing with interface 400.

Some implementations may also provide multiple different calls or call components and recommend one or more of the multiple calls/components as part of the user feedback. For example, consider an implementation where there are three different reeds available from a particular manufacturer for a particular grunt tube. Now, further assume that most users tend to operate a first one of the reeds at relatively lower frequencies than a second one of the reeds, and the second reed at relatively lower frequencies than a third one of the reeds. For example, say an average user would tend to operate the second reed about 300 kHz higher than the first reed (based on experimental data, for example) and the third reed about 300 kHz higher than the second reed and 600 kHz higher than the first reed.

Under these circumstances, interface 400 may include an option to input the reed that the user is using for the reference call. Here, since the second phase of the user call is about 600 Hz less than the reference call, if the user inputs that they are using the first reed for the user call, they may be recommended to try the third reed to help "correct" their usage. If, instead, the user call were about 300 Hz less than the reference call, they may be recommended to try the second reed instead. Note some implementations may also use color-coding or other means (e.g., letters, names) to distinguish different reeds. Further implementations may display an instruction to a user that indicates how to adjust a particular calling device or calling device component. For example, a user may be instructed to adjust a grunt tube (often by rotating a first portion of the grunt tube in one direction or another relative to a second portion to create more or less back pressure) based on the characteristics of the sounds the user makes when trying to operate the call. In some implementations, characteristics of an adjustable grunt tube for different configurations can be used, e.g., if the grunt tube tends to make higher-frequency and/or louder sounds in a first position than in a second position, users can be recommended to switch from the second position to the first position if their calls are too low in frequency or lack sufficient volume.

Interface 450 can be shown to the user to indicate how the user can change their behavior to operate a given calling device to more accurately reproduce a given reference call. For example, after the user tries calling and produces a sound such as shown in user call 402, instruction interface 450 can be generated to explain to the user how to operate a bugling device to more closely match reference call 401. Here, the user can generally be instructed to reduce the length of the first phase of the call, increase the pitch more quickly in the first phase (e.g., by applying more pressure to the reed), maintain higher pitch in the second phase, and lower the pitch in the third phase. The user can also be provided with a recommendation to provide a different reed, e.g., the third reed (reed #3) from the aforementioned example. Note that further implementations can provide a graphical interface to suggest a different calling device entirely (e.g., a different grunt tube/reed combo, different cow call, etc.) or adjustments to an adjustable calling device. Interface 400 can also have guidelines 403 and 404, respectively, that indicate where the second phase and third phase begin in the reference call.

Note that interfaces 400 and/or 450 can be generated on a client device that performs method 300 in its entirety, or some functionality can be performed by a server. For example, in some implementations, a user at a client device (mobile, tablet, laptop, etc.) navigates via a browser to a webpage, selects a particular type of call ((cow call, bugle) or calling device to practice, and makes a calling sound. A microphone and A2D on the client device are used to provide the digital representation (or frequency parameters, etc.) to the server hosting the webpage, and the server compares the parameters of the user call to a reference call. The server can generate interfaces such as 400 and/or 450 (e.g, via one or more webpages) and send the interfaces for display on the client device.

In further implementations, the server can lock certain functionality so that, by default, interfaces and/or feedback are not provided. Rather, users can be given a key or passcode when purchasing a particular animal calling device that allows them to use the server as discussed above. Thus, for example, a user with a key or password calling device A may be able to access the server, make calls for comparison against a reference call for device A (e.g., an elk bugle), and receive feedback. This same user may not have a key or password for a cow call and thus can only practice bugling with the website. A different user with a key or password for calling device B (e.g., a cow call) may be able to access the server and practice cow calling but not bugling. Note that keys/passwords can be used in a similar fashion when the processing is performed locally on a client device, e.g., the user can unlock certain reference calls and feedback functionality by keys/passwords provided with different calling devices.

In further implementations, parameters from practicing users can be used to refine particular calling devices. For example, for a user that averages 200 Hz below the correct peak frequency, the user can be provided with a custom calling device that tends to produce higher-frequency calls (e.g., avg 200 Hz higher) than the device they currently have. As a another example, consider a calling device where most of the users practicing with that calling device are generating frequencies that are too high. In this case, a revised version of the device can be put into production that tends to produce lower frequencies. In some implementations, therefore, users indicate specifically which brand/model of device they are using and this information can be provided via a network to a server associated with the manufacturer of the device along with user call parameters and/or digital representations (samples). Accordingly, the manufacturer can make appropriate revisions to the calling device.

Types of Calls Made by Animals

Some animals use a variety of different calls to signal different meanings to other members of their species. Some species use one or more alert calls, e.g., a sharp bark, etc. to signal danger to other members of the species. In some cases, a user attempting to use a calling device may inadvertently make a sound that is similar to an alert call. Thus, in some implementations, method 300 can include using such an alert call as a reference call. If the user makes a sound with the calling device that is sufficiently similar to the alert call, the user can be provided with an indication that they have made such an alert call. In such implementations, the user can also be provided with instructions on how not to make the alert call, since presumably the user is not operating the calling device with the intention of scaring animals away from them. As a particular example, an elk cow will often make a sharp "bark" sound when alarmed. Recordings of this sound can be recorded from live elk, parameters extracted, and used as the reference call, or, alternatively, a calling device can be used to generate the reference call. If a user of a calling device make such a sound, the user can be provided with a visual or audio warning that they should not make that particular sound in the woods, e.g., a message indicating that the user has just made a sound similar to an alert call.

As another example, the aforementioned elk bugle can be used in various contexts, particularly by male elk. Some elk bugles are more social in nature and are not intended to convey a threatening meaning. Conversely, other elk bugles are more aggressive, and are intended to challenge nearby males that may be competing with the elk emitting the bugle. Depending on the specific needs of the individual operating an elk call, there can be some utility to making either type of call. During certain times of the year, the elk "rut" or mating season can change the behavior of elk. Bulls may tend to challenge each other for dominance earlier in the rut, e.g., during a harem-gathering phase. During this time, elk may tend to be more responsive to aggressive-sounding bugles. However, smaller or immature bulls may be scared off by aggressive-sounding bugles because these animals may not wish to challenge dominant bulls. Thus, an elk hunter wishing to call in only a very large, dominant animal may be well-served to perform an aggressive bugle. However, other elk hunters who only wish to locate other animals and are content to harvest a smaller bull may not want to make an aggressive bugle sound, for fear of scaring off smaller animals. Furthermore, as the rut goes on, even very dominant "herd bulls" may tend to avoid aggressive-sounding bugles because they are tired from fighting and breeding and also because they may have already gathered their herd and do not want to risk losing cows from the herd.

Thus, the reference calls used at block 301 can include variations on particular type of call. In some implementations, the user can select whether to try to make an aggressive-sounding bugle or a social bugle. In either case, a corresponding real elk call can be used as the reference call or another user operating a calling device (e.g., an expert). Thus, users can practice making both types of calls by using reference calls for both social and aggressive bugles. In some instances, different calling devices can tend to produce social (or aggressive) bugles, and thus method 300 can be useful for the user to determine which of their calling devices tends to produce aggressive bugles and which tend to produce social bugles. For example, if a user uses a first diaphragm and/or grunt tube in combination and the sounds they make tend to match an aggressive bugle, and a second diaphragm and/or grunt tube in combination tend to make more social bugles, the user can take this into account in deciding which diaphragm/grunt tube to use in particular real-world situations.

Graphical or other interfaces can be used to select different types of calls as a reference call. For example, a user may be provided with a graphical menu listing a series of selectable options, e.g., "Cow call," "Dominant Bugle," "Chuckle," etc. Users can then select the individual call type (e.g., multiple call types for a single species of animal). Reference parameters can be loaded for that particular call type and used for comparison when the user call is received. Other implementations can provide feedback that indicates whether a user's call matches a particular type, e.g., a message indicating "That was an aggressive bugle" or "That was a social bugle." This can be performed by identifying a best match among multiple reference calls, e.g., if the user call is a best match for a social bugle reference call and less of a match for an aggressive bugle, the feedback indicates the user made a social bugle.

Variation in Calls

Another interesting issue that arises in the context of animal calls is the desirability of sounding "natural." Humans tend to learn how to sing or play instruments in a rhythmic fashion, e.g., learning how to match sounds from recordings by making different sounds at regular intervals that are defined by the beat of the music. However, natural sounds such as animal calls often do not have any apparent rhythmic component. Thus, if a user uses an animal call in a repeated or rhythmic fashion, this would tend to sound relatively unnatural, and possibly alert animals to the presence of the user. Likewise, animal calls such as elk bugles tend to be used fairly sparsely—elk do not normally bugle constantly or at regular intervals for sustained periods of time. Rather, some restraint is usually appropriate on the part of an individual trying to call an elk, and this tends to be true with other animals as well.

Another related issue is that natural sounds tend to be somewhat different each time they are made. In other words, an elk may bugle five times over the course of ten minutes, and there will likely be some variation in each of these bugles. In contrast, when an individual learns to sing a melody or play a rhythm part of a song, often the intent is to essentially duplicate the melody or rhythm part several times with precision.

In view of the above, some implementations can encourage users to employ a certain amount of variation in the timing with which they produce animal calls, and also to encourage users to provide some variation in the duration, pitch, and phrasing of the individual calls. To the extent that the user can learn to vary their calls somewhat while still sounding essentially like an elk bugle, this may help such a user to sound somewhat more "conversational" and less mechanical when employing the calling device. For example, some implementations can determine whether a user is operating a call at relatively regular intervals, e.g., approximately every 5 seconds+/−0.5 seconds, etc. In this case, the user can be provided with feedback indicating they are calling at too regular an interval.

Some implementations may also use multiple reference calls. Each individual user call can be compared on a one-by-one basis with the multiple reference calls to determine whether the user call matches any of the reference calls. If the user is consistently matching only one of the reference calls, the user can be provided with certain indications that they should try matching other reference calls. For example, a first reference call could be as described above, e.g., 0.5 Khz to 2 Khz, a whistle-like second phase with a relatively constant frequency of approximately 2 Khz, and a third phase of generally decreasing frequency from approximately 2 Khz back to 0.5 Khz with respective durations of 1 second, 1.2 seconds, and 0.3 seconds, respectively, for a totally duration of 2.5 seconds. A second reference call could be slightly different, e.g., with the first phase starting at 0.4 Khz and otherwise identical. A third reference call could be different still, e.g., with the first phase starting at 0.4 Khz and the third phase also ending at 0.4 Khz. A fourth reference call could have the frequency characteristics of the first reference call but with a 0.9 second first phase, 1.3 second second phase, and 0.3 second third phase. A fifth reference call could have the frequency characteristics of the first reference call but have a 1.3 second second phase for a total duration of 2.6 seconds, etc.

In further implementations, multiple reference calls can be used to define an "average" call or set of parameters that collectively constitute a reasonable elk call. For example, in one implementation, a user call may be considered a "pass" if the call is between 2.3-3 seconds in duration, the first phase is between 0.8 and 1.2 seconds, the second phase is between 1.0 and 1.4 seconds, and the third phase is between 0.2 and 0.5 seconds, with a frequency range of 0.35-0.65 Khz to start the first phase and end the third phase and a frequency peak of between 1.8 and 2.2 Khz for the first and third phases and for the duration of the second phase. Any user call that does not meet these parameters can be considered a "fail." To the extent the user essentially duplicates a user call over and over, e.g., very little variation in the phase durations (e.g., 0.05 seconds) or the start/end of frequencies of the individual phases (e.g., +/−0.05 Khz start/end frequency), the user can be provided with an indication that they should try to vary the call somewhat, provided they stay within the broader range of acceptable durations/frequencies for the individual phases of the reference call. Alternatively, the user's call can be compared with previous user calls to determine whether the user is consistently making identical calls instead of providing some degree of natural variation in their calls.

There may be certain difficulties in encouraging a user provide some variation in how often they use the calling device. In the context of an application specifically for learning how to use the calling device, e.g., a dedicated portable device or a software application for training the user, exercising restraint with the calling device could become somewhat boring. Users may not want to have to sit quietly waiting next to a computer for an appropriate time to use their call.

Some implementations may incorporate the disclosed techniques into a hunting video game, which may tend to alleviate this relative boredom. For example, the user may be playing a video game where different animals appear on the screen to be harvested by the hunter. The probability that a particular animal will appear on the screen can be a function of how well the user operates the call. In such implementations, the video game can even encourage the user, e.g., with a message to "make an aggressive bugle" or "try a non-aggressive bugle."

Figure 5:
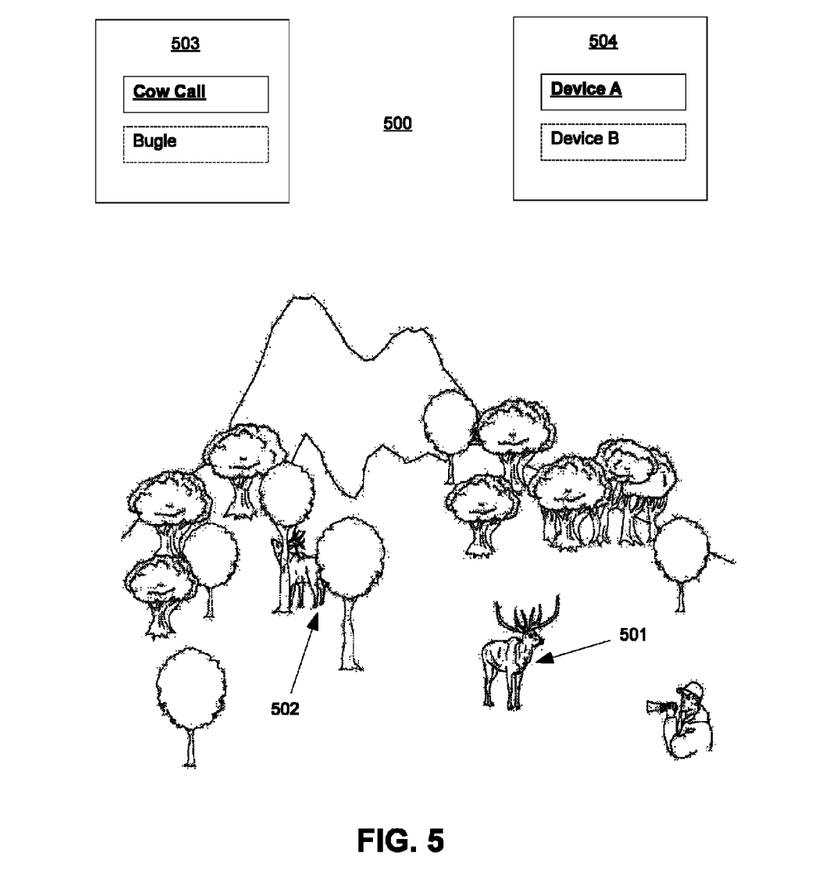
FIG. 5 shows example graphical user interfaces with a video game implementation consistent with certain embodiments of the invention.

FIG. 5 illustrates an exemplary video game interface 500. If the user operates the call relatively well, e.g., within the parameters for the particular call they are instructed to make, then the game can cause an animal to appear on the screen, move closer to the user to investigate, call back to the user, etc. (or, for video games with a probabilistic model for animal behavior, increase the likelihood the animal appears, moves closer, calls back, etc.). This is illustrated in FIG. 5 at instance 501, where an elk has moved relatively close to the video game user.

Conversely, if the user operates the call relatively poorly, e.g., the sound does not match the parameters for any type of elk sound or sounds like an aggressive bugle when this is not appropriate (e.g., trying to call a smaller bull shown on the screen), the video game can cause the animal to disappear on the screen (or not appear in the first place), to move further away from the user, or to not call back to the user (or, for video games with a probabilistic model of animal behavior, decrease the likelihood that the animal appears on the screen, increase likelihood the animal disappears, decrease the likelihood that the animal moves closer, or decrease the likelihood that the animal calls back). This is represented in FIG. 5 at instance 502, where the elk has moved away from the video game user in response to the user's incorrect operation of the call.

In some implementations, when video game animals call back to the user if the user successfully operates the call, and the video game can cause an animal to respond to the user with a call that is determined based on the call made by the user. For example, if the user makes an aggressive bugle the video game may cause an in-game elk bull to respond with an aggressive bugle, and/or cause the responding animal to begin approaching the video game user. If the user makes a social bugle, the video game may cause an in-game elk cow to respond with "cow talk" or sounds commonly made by female elk. Also, note that if the user makes an alarm call during the video game (or a loud, unnatural frequency out of the range of vocalization of the animal being called), many or all video game animals in the vicinity of the user may disappear, move away from the user, or stop responding to the user even if subsequent calls by the user are correct calls (e.g., match non-alarm reference calls).

In this context, it can also be useful to encourage the user not to use the call too often. For example, if the user operates the call too often, e.g., more than 3 times in a minute, the video game can cause the animal to move away from the user, not appear in the first place, or stop responding to the user's calls. Conversely, if the user exercises some restraint and does not operate the call more than 3 times in a minute, the video game can reward the user by causing the animal to appear on the screen, to begin approaching the user, or to respond to the user's calls. Likewise, if the user uses the call at too regular an interval, the animals can move away, not appear, stop calling, etc. If the user uses the call at a more natural interval, e.g., uses variations in the durations between calls, the animals can move closer, appear, start calling again, etc.

The above techniques can also be applied using different specific types of calls, instead of variations on a single call type (e.g., bugle variations). For example, male elk emit roars, bugles, and chuckles, often more or less in that order. As mentioned above, the bugle call in particular can have certain aggressive or non-aggressive variations. Actual roars and chuckles (or calling devices operated to produce these sounds) can also serve as reference calls. If the user provides user calls that match a roar, bugle, and chuckle in this order and in timing that is approximately similar to one or more reference recordings of elk, the user can be provided with an indication that they have successfully matched a reference sequence. Conversely, certain sequences of calls and/or time spacing between calls can be defined as "incorrect," e.g., four straight chuckles within 20 seconds without an interspersed bugle could be defined as an incorrect sequence.

As mentioned above, in the context of a small special-purpose device, a simple LED can be used to indicate the user has correctly performed the roar/bugle/chuckle sequence. In the context of a hunting video game, an on-screen animal can respond with a call, move closer, call back, etc. to acknowledge the sequence, thus giving the user a positive indication that they have performed the sequence correctly. However, if the user is, e.g., constantly bugling and not mixing in some roars and chuckles, the user can be provided with negative feedback, e.g., a simple LED message, an elk moving away on the video screen or ceasing to respond to the user calls, a voice or written message on a GUI, etc. The user can also be encouraged using these techniques not to make the exact same sequence each time, e.g., if the user does roar/bugle/chuckle constantly without mixing in a few roar/bugle/bugle/chuckle (double bugle), or just a single roar without a bugle or chuckle, etc., this can also sound unnatural.

Generally speaking, the above can be accomplished by comparing user calls to various predetermined patterns. For example, the time between each user call can be determined by the video game. If more than a certain number of calls (e.g., 3) are produced and each call is separated by an amount of time that falls within a regular interval (e.g., 10 seconds, +/−1 second) the user can be provided with negative feedback as indicated above (e.g., causing animals to move away or not appear). A counter can be used to count the number of consecutive calls that fall within the regular interval and can be reset once a call falls outside the interval. Thus, a user call beginning at 10 seconds (counter starts at 1), beginning at 20 seconds (counter increment to 2 since 10 second difference is within +/−1 second of the regular interval of 10 seconds), and beginning at 31 seconds (another counter increment to 3 since 11 second difference is within the regular interval) would result in negative feedback. As a counterexample, user calls beginning at 10 seconds, 22 seconds, and 32 seconds followed by a 20 second break would not result in negative feedback. In the second example, the second call at 22 seconds would reset the counter to 1 since this exceeds the 10 seconds+1 interval. Note that the counter could increase to 2 at 32 seconds since that is the second call in the regular interval and then be reset 11 seconds later.

Counters can also be used to track consecutive call types. For example, a limit of 3 bugles, chuckles, or roars can be applied so that any three of the aforementioned calls consecutively will trigger negative feedback. Thus, the sequence bugle, bugle, bugle triggers negative feedback but not the sequence bugle, bugle, chuckle, bugle, bugle, since the chuckle call can reset the bugle counter. This can also be applied to multiple calls of a specific type, e.g., three consecutive very similar bugles (e.g., not varying more than 0.1 second in duration or 100 Hz at any point after time alignment) can also produce negative feedback, whereas interspersing a different bugle (e.g., differing in duration more than 0.1 second or more than 100 Hz but otherwise still a reasonable sounding bugle) can reset a counter and prevent the negative feedback.

Thus, one goal of the disclosed implementations can be to teach the user not only how to operate the calling to make individual animal calls that sound realistic, but to learn to use the calling device to engage in an appropriate "conversation" with the species of interest. As another example, the disclosed implementations can determine if the user is in a reasonable location to make a given call, e.g., during a video game. If the user is reasonably well-hidden, e.g., behind a tree or rock, downwind from an animal, not silhouetted against the sky, etc., then the user can be rewarded as mentioned above if they operate the call correctly. However, if the user is otherwise detectable to the animals in the video game, e.g., upwind, not hidden, silhouetted, etc., then even if the user operates the calling device correctly this may not be the best decision. Thus, the video game can respond as if the user has outed themselves to the video game animals as mentioned above.

As still another example, if the user makes the call at a relatively high elevation in a direction with a clear path for sound to travel, the video game can effectively reflect the relatively greater effective distance of the call by causing animals that are further away to respond to the call. Conversely, if the user is in a valley, heavy foliage, or otherwise obstructed from the video game animals, the effective distance of the call may be less and video game animals may not respond to the user call from outside the effective distance.

As previously mentioned, reference calls other than calls made by actual live animals can be used. For example, in some implementations, the reference call can be derived from other users, e.g., an expert game caller, operating a calling device. Thus, the user call can be compared to a call made by an expert using the same calling device to determine whether the user is correctly operating the calling device. In still further implementations, a user (e.g., graphical) interface can be presented to the user that allows them to select from different options for calling devices. For example, if the user selects the Primos® Cow Girl™ from the interface, the reference call can be an expert operating the Primos® Cow Girl™. If, instead, the user selects the Hunter Specialties Lonesome Cow Elk Call®, the reference can be an expert operating this calling device instead. In the context of a video game, the user can select between different calling devices that they have available while playing the game and practice using the different calling devices in this fashion. This is also the case in the context of a standalone device or training software application, e.g., the user can select the particular device they want to train on and an appropriate reference call can be used for comparison. Further implementations can also present a training video to the user, e.g., a hyperlink to an expert user demonstration can be provided in any of the graphical user interfaces herein. The particular hyperlink can be dependent on user inputs, e.g., a user who indicates they are cow calling can be taken to a video on cow calling, a user indicating a specific calling device can be taken to a video demonstration for that particular device, etc.

Some implementations may provide a call type menu 503 that allows a user to select what type of call they would like to make. For example, the user may select (via mouse, joystick, or other input) that they would like to try a cow call. In this case, reference parameters for a cow call can be loaded to compare the sound that the user makes with their call, e.g., reference parameters from a real cow elk, from an expert user operating a cow call calling device, etc. Further implementations may provide a calling device menu 504 that allows a user to select a specific calling device that is appropriate for the call type they have selected. Menu 504 may be populated after the user makes a selection in menu 503 with appropriate call types. Thus, Device A may represent a first type of cow calling device and Device B may represent a second type of cow calling device, e.g., two different brands, two different types (diaphragm vs. bite & blow, etc.). In this case, reference parameters can be loaded that are particular the actual calling device the user has selected, e.g., an expert user operating Device A. Note also that interfaces such as 400 and/or 450 can be provided to the user in the context of a video game (e.g., overlaid on interface 500 or shown on a different screen). In further implementations, reference call parameters for particular types of calling devices (or particular calls) can be "locked" so they are not available to the user of the video game until the user purchases a corresponding call. For example, if Device A and Device B are both cow calls, users purchasing either device may be given a key to unlock the "cow call" feature of the video game that loads reference parameters for cow calls. Alternatively/in addition, a user that purchases Device A can be provided with a key that unlocks reference parameters specifically for Device A, e.g., reference parameters for an expert user operating Device A.

Trail Camera Implementations

In some implementations, the disclosed techniques can be used for a different purpose. Specifically, ambient sound can be recorded in a natural environment and compared to one or more reference calls to determine whether animals in the area have made corresponding calls. Thus, for example, ambient sound in a forest environment can be recorded and compared to an elk bugle reference call. In this context, method 300 can be applied with ambient forest noise serving as the user call. Over time, a recorded log of elk bugling activity in the vicinity of the recording device can be created.

Figure 6:
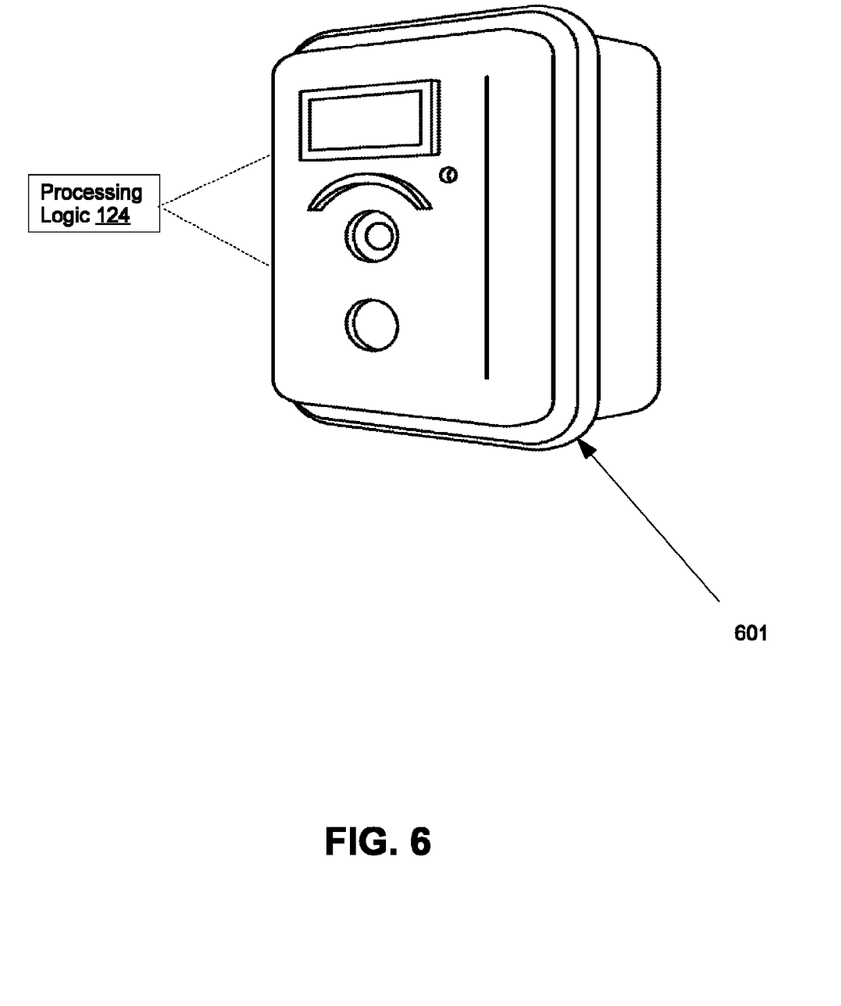
FIG. 6 is an example of a trail camera consistent with certain embodiments of the invention.

In such implementations, processing device 120 can be embodied as a trail camera 601 as shown in FIG. 6. Generally speaking, trail cameras can have motion sensors that detect animal movement and trigger the trail camera to take photographs or video when motion is detected. Since trail cameras tend to already be "ruggedized" (e.g., waterproof/resistant, able to withstand a broad range of temperatures, etc.) trail cameras can be a useful platform for performing the disclosed techniques in a natural environment. For example, a trail camera left in a given forest location for a week in July period may show pictures of bull elk at night moving in a particular direction, but there may not be much, if any, bugling activity at this time. Later on, in September, the same camera may have a log indicating that bugling activity has increased substantially at times when elk are in the area. Thus, adding the above-mentioned capability to a trail camera can give the camera operator additional information, e.g., the state of the rut over time, etc.

Because of power usage constraints, it may not always be advisable for a trail camera to leave a microphone on and constantly perform processing to determine whether ambient sounds include particular animal calls. Thus, some trail camera implementations may provide an interface to select a window during which such processing is performed. For example, the trail camera may provide a graphical user interface on a display of the trail camera itself, or may be configured by a graphical interface on a separate device (e.g., laptop, cell phone, etc.) connected via USB, wireless, or other communication interface. The interface may include options to define individual time periods when "listening" (e.g., applying method 300 to ambient noise) for given animal calls is to be performed, such as times of day (e.g., from 8 PM until 4 AM), before/after a certain date or between certain dates, during a certain phase of the moon, etc. As previously mentioned, method 300 can be performed only for sounds exceeding a threshold volume that fall within the period of time that the device is configured to listen for animal sounds. This can reduce the processing load and battery usage of the trial camera.

Other interface options can also configure which particular sounds to log, e.g., users can select to record only instances of male elk sounds (bugles, chuckles, etc.) while not recording "cow calls," or users may choose to record both. Users may also choose to record different species, e.g., deer grunts, deer rattling (antler clashing from fighting), wolf howls, etc. Note that other interface options besides graphical interfaces can be used, e.g., the trail camera may have a series of switches (e.g., housed inside the camera) that are settable to select different call types to listen for, times to listen, etc. Some implementations may also configure the trail camera to record human voices exceeding a threshold volume during the listening interval. This can be useful, for example, when other hunters are in the area of the trail camera. Another useful reference call in this instance can be a gunshot sound. By using one or more gunshot sounds as reference calls, the trail camera can keep a log of any gunshots in the area. Since hunters typically will not want to hunt an area that has been recently disturbed by shooting, a log of shooting activity can also be a useful tool.

When the user returns to check the trail camera, the trail camera may provide a log of sound activity for the user. For example, the log may indicate sound activities as well as times, e.g., "4 Bugles recorded for 9/16/2012: 8:36 PM, 8:48 PM, 8:59 PM, 11:56 PM. One wolf howl for 9/17/2012: 9:12 AM. One gunshot for 9/18/2012: 12:36 PM." Some implementations may also group the recorded sounds with pictures taken by the trail camera within a certain time window, e.g., pictures taken by the trail camera within 10 minutes of any individual bugle may be paired in the log with the bugle in the hopes that the camera my provide a picture of the specific animal that made the recorded sounds. Note also that in this context "record" can mean simply making an entry in a log indicating that a given animal sound was matched by the processing, or can alternatively mean actually making and persistently storing a recording of the sounds that were matched by the processing.

CONCLUSION

Using the above-disclosed system, devices, and techniques, users can be provided with feedback on whether they are correctly using an animal calling device without having to try the device out in the presence of a live animal. Furthermore, by indicating to the user which particular type of call they have made, the user can further refine their understanding of what different real animal calls sound like to the human ear. The different implementations may have different benefits, e.g., a stand-alone device may be sufficiently portable for the user to carry with them in the outdoors. A dedicated software application for training the user can be configured with various graphical interfaces that show the user exactly where their user calls need improvement, interfaces that show how to correctly operate the call, etc. An implementation in a hunting video game can provide a realistic scenario that enables the user to practice different types of calls and have animals in the video game respond in a manner similar to that the user might experience in the outdoors. Collectively, the disclosed implementations may allow the user to be better positioned to operate a calling device properly when they do get the chance to use the calling device for real, perhaps even on a once-in-a-lifetime trip. Further implementations may use a trail camera to process ambient sound in a natural environment and create a log of animal calling activity.

The invention claimed is:

1. A method performed by a computing device, the method comprising:
    storing one or more reference call parameters for a reference call, the reference call being a recording of a wild animal sound;
    receiving a user call, the user call being a live sound made by a user operating a mechanical wild animal calling device;
    extracting one or more user call parameters from the user call;
    comparing the one or more user call parameters to the one or more reference call parameters; and
    providing an indication of whether the user call matches the reference call based at least on the comparing,
    wherein:
    in a first instance when the user call matches the reference call, the indication comprises a video game representation of a wild animal appearing to move toward the user, and
    in a second instance when the user call does not match the reference call, the indication comprises the video game representation of the wild animal appearing to move away from the user.

2. The method according to claim 1, wherein the recording of the wild animal sound is a recording of an actual non-human animal making the animal sound.

3. The method according to claim 1, wherein the recording of the reference call is a recording of another user operating another mechanical wild animal calling device.

4. The method according to claim 1, wherein the comparing comprises comparing frequencies of a plurality of samples of the user call to a plurality of samples of the reference call.

5. The method according to claim 4, further comprising determining whether individual samples of the user call are within an acceptable frequency variance from corresponding individual samples of the reference call.

6. The method according to claim 5, further comprising performing alignment processing to identify correspondence between the individual samples of the user call and the individual samples of the reference call.

7. The method according to claim 1, wherein the reference call is an alert call that signals danger to wild animals of a particular non-human species.

8. The method according to claim 1, wherein the computing device comprises an FPGA or ASIC configured to execute the method.

9. The method according to claim 1, implemented on one or more of a specially-programmed stationary computing device, a specially-programmed mobile device, a specially-programmed gaming console, or a specially-programmed server.

10. The method according to claim 1, further comprising providing a user option to select different wild animal call types or different wild animal calling devices and selecting the reference call parameters for a selected wild animal call type or selected wild animal calling device.

11. A system comprising:
a processor;
a video game configured to execute on the processor, the video game comprising logic configured to:
receive one or more user call parameters corresponding to a user call, wherein the user call is made by a user operating a mechanical animal calling device;
compare the one or more user call parameters to one or more reference call parameters of a reference call to determine whether the one or more user call parameters match the one or more reference call parameters;
responsive to the one or more user call parameters matching the one or more reference call parameters, cause a representation of a wild animal to appear on a screen, appear to move closer to the user, or to respond to the user call; and
responsive to the one or more user call parameters not matching the one or more reference call parameters, cause the representation of the wild animal not to appear on the screen, to appear to move further away from the user, or to not respond to the user call.

12. The system according to claim 11, the logic being further configured to:
determine a number of times that the user operates the mechanical animal calling device within a time period; and
responsive to the user operating the mechanical animal calling device more than a certain number of times within the time period, cause the representation of the wild animal not to appear on the screen, to appear to move further away from the user, or not to respond to the user call.

13. The system according to claim 12, the logic being further configured to:
responsive to the user operating the mechanical animal calling device properly no more than the certain number of times within the time period, cause the representation of the wild animal to appear on the screen, to appear to move closer to the user, or to respond to the user call.

14. The system according to claim 12, the wild animal being an elk.

15. The system of claim 11, the logic being configured to cause the representation to appear on the screen responsive to the one or more user call parameters matching the one or more reference call parameters.

16. The system of claim 11, the logic being configured to cause the representation to appear to move closer to the user responsive to the one or more user call parameters matching the one or more reference call parameters.

17. The system of claim 11, the logic being configured to cause the representation to respond to the user call responsive to the one or more user call parameters matching the one or more reference call parameters.

18. The system of claim 11, the logic being configured to cause the representation to not appear on the screen responsive to the one or more user call parameters not matching the one or more reference call parameters.

19. The system of claim 11, the logic being configured to cause the representation to not respond to the user call responsive to the one or more user call parameters not matching the one or more reference call parameters.

20. The system of claim 11, the logic being configured to cause the representation to appear to move further away from the user responsive to the one or more user call parameters not matching the one or more reference call parameters.

* * * * *